(12) United States Patent
Cheng (10) Patent No.: US 12,257,471 B2
(45) Date of Patent: Mar. 25, 2025

(54) COUNTERWEIGHT ADJUSTING APPARATUS FOR WEIGHT-LIFTING EQUIPMENT

(71) Applicant: Zhengxiang Cheng, Hubei (CN)

(72) Inventor: Zhengxiang Cheng, Hubei (CN)

(*) Notice: Subject to any disclaimer, the term of this patent is extended or adjusted under 35 U.S.C. 154(b) by 200 days.

(21) Appl. No.: 18/184,920

(22) Filed: Mar. 16, 2023

(65) Prior Publication Data

US 2024/0285995 A1 Aug. 29, 2024

(30) Foreign Application Priority Data

Feb. 24, 2023 (CN) .......................... 202320335044.4

(51) Int. Cl.
*A63B 21/072* (2006.01)
*A63B 21/075* (2006.01)

(52) U.S. Cl.
CPC ........ *A63B 21/0728* (2013.01); *A63B 21/075* (2013.01)

(58) Field of Classification Search
CPC ........ A63B 21/00058; A63B 21/00061; A63B 21/00065; A63B 21/00069; A63B 21/062; A63B 21/0624; A63B 21/0726; A63B 21/0728; A63B 21/075; A63B 2225/09; A63B 2244/09
See application file for complete search history.

(56) References Cited

U.S. PATENT DOCUMENTS

| | | | | |
|---|---|---|---|---|
| 1,672,944 | A * | 6/1928 | Jowett ................ | A63B 21/0728 482/108 |
| 3,022,073 | A * | 2/1962 | Miller ................ | A63B 21/0728 482/106 |
| 4,893,810 | A * | 1/1990 | Lee .................... | A63B 21/0728 24/115 L |
| 5,295,934 | A * | 3/1994 | Collins .............. | A63B 21/0728 482/107 |
| 5,346,449 | A * | 9/1994 | Schlagel ............ | A63B 21/0728 482/107 |
| 5,464,379 | A * | 11/1995 | Zarecky ............. | A63B 21/0728 482/106 |
| 6,059,700 | A * | 5/2000 | Ellenburg .......... | A63B 21/0724 482/107 |
| 7,025,713 | B2 * | 4/2006 | Dalebout ........... | A63B 21/0728 482/107 |

(Continued)

FOREIGN PATENT DOCUMENTS

CN 114470625 A * 5/2022
CN 117282073 A * 12/2023

*Primary Examiner* — Gary D Urbiel Goldner (57) ABSTRACT

A counterweight adjusting apparatus for weight-lifting equipment includes a connection assembly and a limiting assembly for sleeving counterweight sheets. The limiting assembly includes a limiting plate, a sleeve rod is provided on the limiting plate, the sleeve rod is inserted into the connection assembly, a clamping member is provided in the connection assembly, at least one clamping groove is provided on the sleeve rod, the clamping member is matched with the at least one clamping groove, and the clamping member is adjustably clamped with the at least one clamping groove. The connection assembly includes a main body, a detachable connection structure is provided on an end of the main body, and the detachable connection structure is a threaded structure.

7 Claims, 7 Drawing Sheets

(56) References Cited

U.S. PATENT DOCUMENTS

| | | | |
|---|---|---|---|
| 7,182,716 B1* | 2/2007 | Dawson | A63B 21/072 |
| | | | 482/107 |
| 7,780,582 B2* | 8/2010 | Anderson | A63B 21/075 |
| | | | 482/106 |
| 7,887,469 B1* | 2/2011 | Chen | A63B 21/075 |
| | | | 482/107 |
| 8,210,996 B2* | 7/2012 | Anderson | A63B 21/063 |
| | | | 482/107 |
| 11,273,338 B2 | 3/2022 | Chen | |
| 11,439,859 B2 | 9/2022 | Shangguan | |
| 11,458,348 B1* | 10/2022 | Wang | A63B 21/0722 |
| 12,115,407 B1* | 10/2024 | Norris | A63B 21/075 |
| 2008/0254953 A1* | 10/2008 | Krull | A63B 21/075 |
| | | | 482/107 |
| 2011/0045956 A1* | 2/2011 | Colledge | A63B 21/075 |
| | | | 482/107 |
| 2022/0105381 A1* | 4/2022 | Anderson | A63B 21/4035 |
| 2022/0355153 A1 | 11/2022 | Abbott et al. | |
| 2022/0355163 A1 | 11/2022 | Aly et al. | |
| 2022/0409945 A1 | 12/2022 | Bhandarkar et al. | |
| 2024/0157188 A1* | 5/2024 | Chiang | A63B 21/0728 |

* cited by examiner

COUNTERWEIGHT ADJUSTING APPARATUS FOR WEIGHT-LIFTING EQUIPMENT

TECHNICAL FIELD

The present invention relates to the field of fitness equipment, and in particular, to a counterweight adjusting apparatus for weight-lifting equipment.

BACKGROUND

Weight-lifting equipment includes dumbbells, barbells, kettlebells, etc. For weight-lifting fitness enthusiasts, different types of weight-lifting equipment are selected in different exercise phases, and the weight requirements are also different, so the weight of weight-lifting equipment needs to be adjusted frequently. In addition, the adjustment methods of kettlebells, dumbbells and barbells are usually different, and the ways of adding counterweight sheets are different, and the overall dimensions of counterweight sheets of different weight-lifting equipment are different, and the weight adjusting apparatus between different weight-lifting equipment cannot be universal, which results in that a variety of equipment needs to be prepared at the homes of weight-lifting enthusiasts and a large space needs to be stored.

Therefore, there is an urgent need to provide a counterweight adjusting apparatus applicable to three types of weight-lifting equipment, and the adjusting process is convenient and fast.

SUMMARY

An object of the present invention is to provide a counterweight adjusting apparatus for weight-lifting equipment, which can be applied to a variety of lifting-equipment, is convenient for the mounting and adjustment of counterweight sheets having different sizes, and takes less space compared with preparing a variety of equipment at the same time.

In order to achieve the above object, the present invention provides the following technical solutions:

A counterweight adjusting apparatus for weight-lifting equipment, comprising a connection assembly and a limiting assembly for sleeving counterweight sheets, wherein the limiting assembly comprises a limiting plate, a sleeve rod is provided on the limiting plate, the sleeve rod is inserted into the connection assembly, a clamping member is provided in the connection assembly, at least one clamping groove is provided on the sleeve rod, the clamping member is matched with the clamping groove, and the clamping member is adjustably clamped with the clamping groove.

Further, the connection assembly comprises a main body, and a detachable connection structure is provided on the end of the main body and is used for connecting a grip handle or grip rod of different types of sports equipment. When connecting a grip handle or grip rod of different types of sports equipment, different sports equipment is formed, thereby meeting different exercise demands.

Further, the detachable connection structure is a threaded structure, and the grip handle or the grip rod can be detachably connected by means of the thread structure, thereby having a more convenient connection method.

Further, a cover plate is detachably connected to the main body, at least one abutting post limiting groove is provided inside the main body, a fourth through-hole is provided on the cover plate at a position corresponding to the abutting post limiting groove, an abutting post is mounted inside the abutting post limiting groove, the diameter of the middle section of the abutting post is greater than those of sections at two ends, a second spring is sleeved on the section at one end of the abutting post, one end of the second spring abuts against the middle section of the abutting post, the other end of the second spring abuts against the interior of the abutting post limiting groove, and the section at the other end of the abutting post protrudes from the fourth through-hole under an elastic force of the second spring. When the abutting post protrudes from the fourth through-hole, the abutting post abuts against the counterweight sheets, thereby eliminating the gap between the counterweight sheets, and preventing the skin of the user's hand from being damaged.

Further, a first through-hole is provided inside the main body, the cross-sectional shape of the first through-hole is a non-circular through-hole shape, and the cross-sectional shape and size of the sleeve rod are matched with the cross-sectional shape and size of the first through-hole. When the sleeve rod is inserted into the first through-hole, the sleeve rod and the first through-hole do not rotate relative to each other, thereby facilitating clamping of the clamping member.

Further, a sliding groove is provided inside the main body at a position corresponding to the first through-hole, and the size of the sliding groove is matched with a main plate of the clamping member; the main plate of the clamping member is provided with a second through-hole used for a sleeve rod to pass through, a clamping tongue is provided on the inner wall of the second through-hole, correspondingly, an opening is provided on the bottom end edge of the first through-hole, and the shape and size of the opening is matched with the shape and size of the clamping tongue.

Further, a pressing plate is provided at the top of the clamping member, a first spring is provided at the bottom of the pressing plate, correspondingly, a pressing through-hole is provided at a position of an outer wall of the main body corresponding to the pressing plate, a spring mounting groove is provided below the pressing through-hole, one end of the first spring is fixedly connected to the pressing plate, and the other end of the first spring abuts against the bottom of the spring mounting groove.

Further, the cross-sectional shape of the first through-hole is in a large cut circular shape.

Further, a limiting post is provided below the pressing through-hole, when the pressing plate moves downwards for a certain distance, the lower edge of the pressing plate abuts against the limiting post, whereby the clamping tongue is pulled out of the clamping groove, so that a user can release the locking of the limiting assembly when explicitly pressing to any position.

Further, a spring mounting plate is provided at the bottom of the pressing plate, and the first spring is fixedly connected to the spring mounting plate.

It can be determined through analysis that the present invention discloses a counterweight adjusting apparatus for weight-lifting equipment. A connection assembly is connected to a limiting assembly in an inserting manner. In addition, the extension length, extension or pulling-out state of the limiting assembly can be limited by means of the clamping member, and the weight adjustment can be achieved by mounting different weights or different numbers of counterweight sheets on the limiting assembly. The adjustment process is simple and convenient, and is applicable to various types of counterweight sheets. A threaded structure is provided on the other end of the connection assembly, which can be respectively connected to a grip of different types of weight-lifting equipment to form corresponding weight-lifting equipment, and a user can select corresponding equipment and counterweight for exercise. Compared with preparing various equipment at the same time, the occupied space is smaller. An abutting post is provided inside the connection assembly, and the abutting post abuts against the counterweight sheets under the action of the second spring, thereby eliminating a gap between adjacent counterweight sheets and preventing the skin of the hand from being damaged.

BRIEF DESCRIPTION OF THE DRAWINGS

The accompanying drawings, which form a part of the present application, are used to provide a further understanding of the present invention. The schematic embodiments of the present invention and the description thereof are used to explain the present invention, and do not form improper limits to the present invention. wherein.

DESCRIPTION OF REFERENCE SIGNS

1—connection assembly; 11—main body; 111—first through-hole; 112—sliding groove; 113—opening; 114—pressing through-hole; 115—spring mounting groove; 116—limiting post; 117—abutting post limiting groove; 12—clamping member; 121—second through-hole; 122—clamping tongue; 123—pressing plate; 124—spring mounting plate; 13—first spring; 14—cover plate; 141—third through-hole; 15—threaded structure; 16—abutting post; 17—second spring; 2—limiting assembly; 21—limiting plate; 221—clamping groove; 22—sleeving rod; 3—counterweight sheet; and 4—grip rod.

DETAILED DESCRIPTION OF THE EMBODIMENTS

The present application will be described below with reference to the drawings and embodiments in detail. The respective examples are provided by means of explanation of the present invention without limiting the present invention. Indeed, it will be apparent to a person skilled in the art that modifications and variations can be made in the present invention without departing from the scope or spirit of the invention. For example, features illustrated or described as being part of one embodiment can be used in another embodiment to yield yet another embodiment. Therefore, it is intended that the present invention cover such modifications and variations as come within the scope of the appended claims and their equivalents.

In the description of the present invention, orientation or position relationships indicated by terms such as "longitudinal", "lateral", "up", "down", "front", "rear", "left", "right", "vertical", "horizontal", "top", and "bottom" are based on orientation or position relationships shown in the accompanying drawings, which are only used to facilitate description of the present invention rather than requiring that the present invention must be constructed and operated in a specific orientation, and therefore cannot be construed as a limitation on the present invention. The terms "connecting", "connected" and "provided" used in the present invention should be understood broadly, for example, may be fixedly connected, and may also be detachably connected; may also be direct connections or indirect connections via intervening components; may also be wired connections or radio connections; and may also be wireless communication signal connections. A person skilled in the art would have been able to understand the specific meaning of the described terms according to specific situations.

One or more examples of the present invention are illustrated in the accompanying drawings. The detailed description uses numerals and letter designations to refer to features in the drawings. Like or similar designations in the drawings and descriptions have been used to refer to like or similar parts of the present invention. As used herein, the terms "first", "second", "third", etc., are used interchangeably to distinguish one member from another, and are not intended to represent the location or importance of the individual members.

As shown in FIG. 1 to FIG. 7, according to an embodiment of the present invention, provided is a counterweight adjusting apparatus of weight-lifting equipment, comprising a connection assembly 1 and a limiting assembly 2 detachably connected to the connection assembly 1, wherein the limiting assembly 2 is used for sleeving counterweight sheets, and different numbers of counterweight sheets are sleeved by means of adjustable connection of the limiting assembly 2 on the connection assembly 1, thereby achieving weight adjustment.

Figure 1:
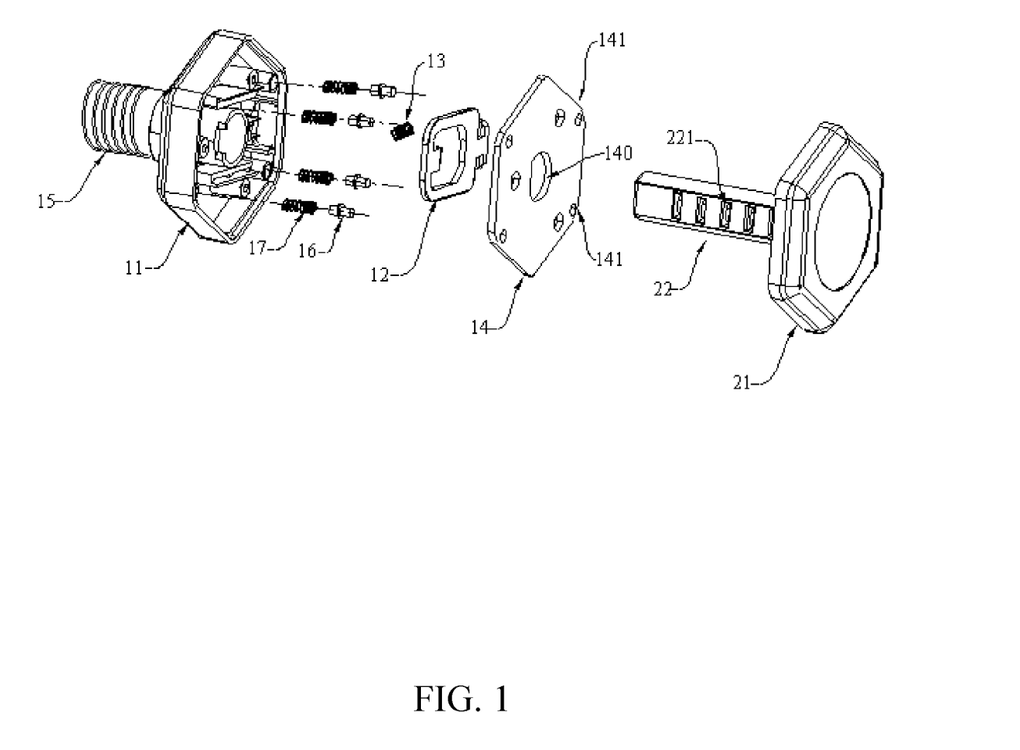
FIG. 1 is a schematic structural explosion view of an embodiment.
Figure 2:
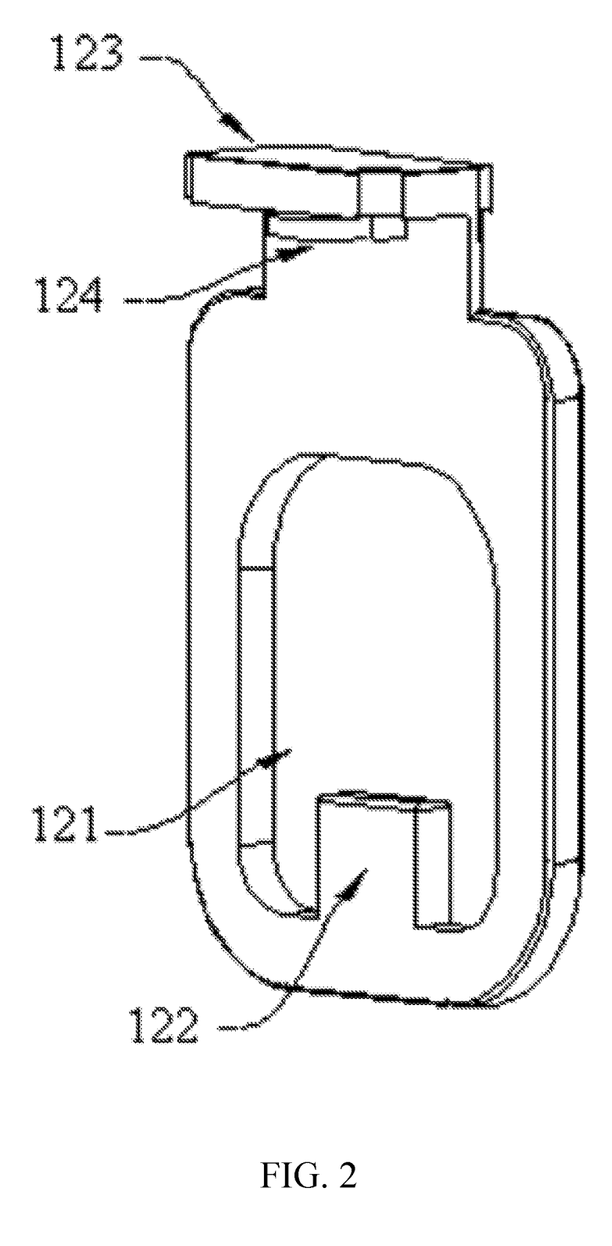
FIG. 2 is a schematic structural view of a limiting assembly of an embodiment.

The connection assembly 1 comprises a main body 11. A central position of the main body 11 is provided with an inwardly communicated first through-hole 111, and the cross-sectional shape of the first through-hole 111 is a large cut circular shape. The limiting assembly 2 comprises a limiting plate 21 and a sleeve rod 22 arranged perpendicular to the central position of the limiting plate 21. The cross-sectional shape of the sleeve rod 22 is the same as the cross-sectional shape of the first through-hole 111, and the size of the sleeve rod is matched with the size of the first through-hole, so that the sleeve rod 22 can be inserted into the first through-hole 111, and when the sleeve rod 22 is inserted into the first through-hole 111, the sleeve rod and the first through-hole will not rotate relative to each other. The connection assembly 1 further comprises a clamping member 12, and the clamping member 12 is slidably mounted inside the main body 11. As shown in FIG. 2, the main plate of the clamping member 12 is provided with a second through-hole 121 used for the sleeve rod 22 to pass through, and a clamping tongue 122 is provided on the inner wall of the second through-hole 121, correspondingly, five clamping grooves 221 are provided on the outer wall of the sleeve rod 22 along the axial direction, and the shapes and sizes of the clamping tongues 122 are matched with those of the clamping grooves 221. When the clamping tongues 122 are inserted into the clamping grooves 221, the clamping member 12 limits the axial movement of the sleeve rod 22, whereby the number of the counterweight sheets cannot be adjusted. The size of the second through-hole 121 is greater than the size of the first through-hole 111, so that the sleeve rod 22 can move in a direction away from the clamping tongue 122 in the second through-hole 121 to separate the clamping tongue 122 from the clamping groove 221, whereby the sleeve rod 22 can move axially relative to the clamping assembly 12. There may be several clamping grooves 221 on the sleeve rod 22. When only one clamping groove 221 is provided, the adjustment of the counterweight can be achieved by replacing counterweight sheets having different weights. When more than one clamping groove 221 is provided, the adjustment of the counterweight can be achieved by replacing counterweight sheets having different weights, and the adjustment of the counterweight can also be achieved by increasing or decreasing the number of the counterweight sheets.

Figure 3:
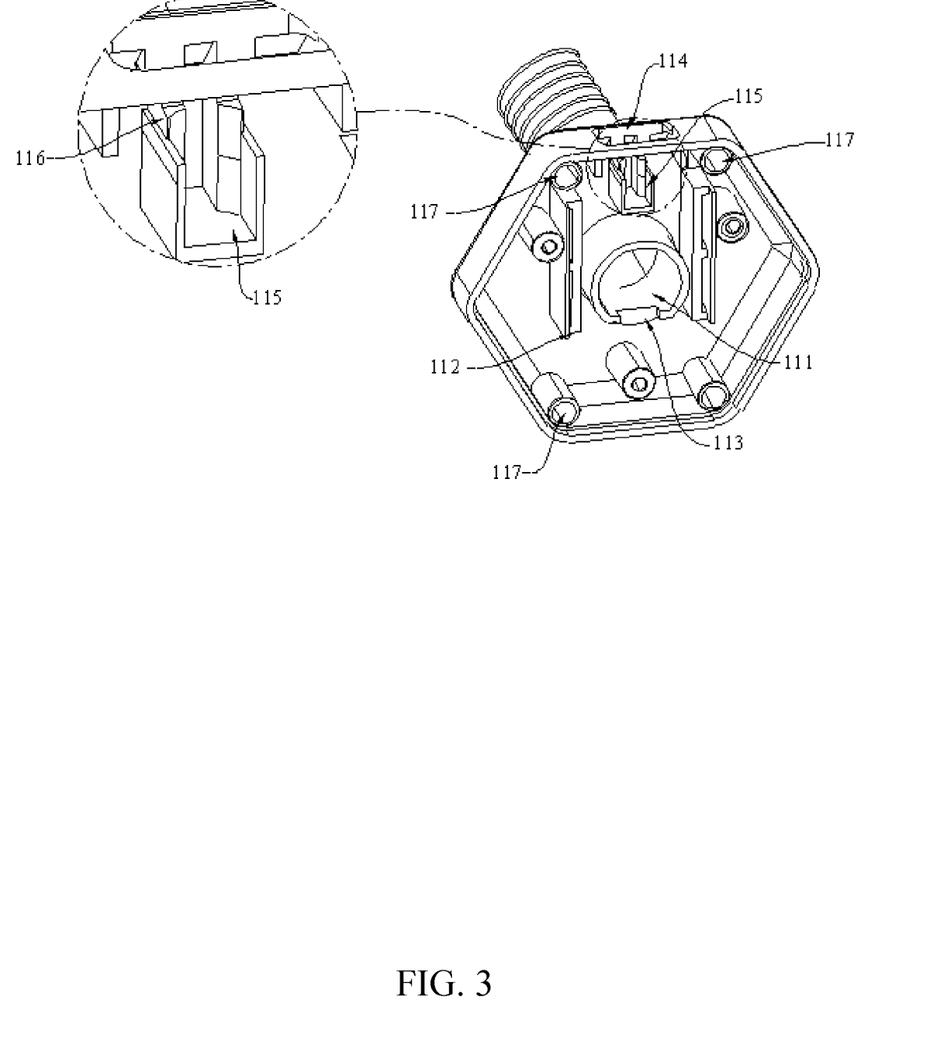
FIG. 3 is a partially enlarged view of a connection assembly of an embodiment.
Figure 4:
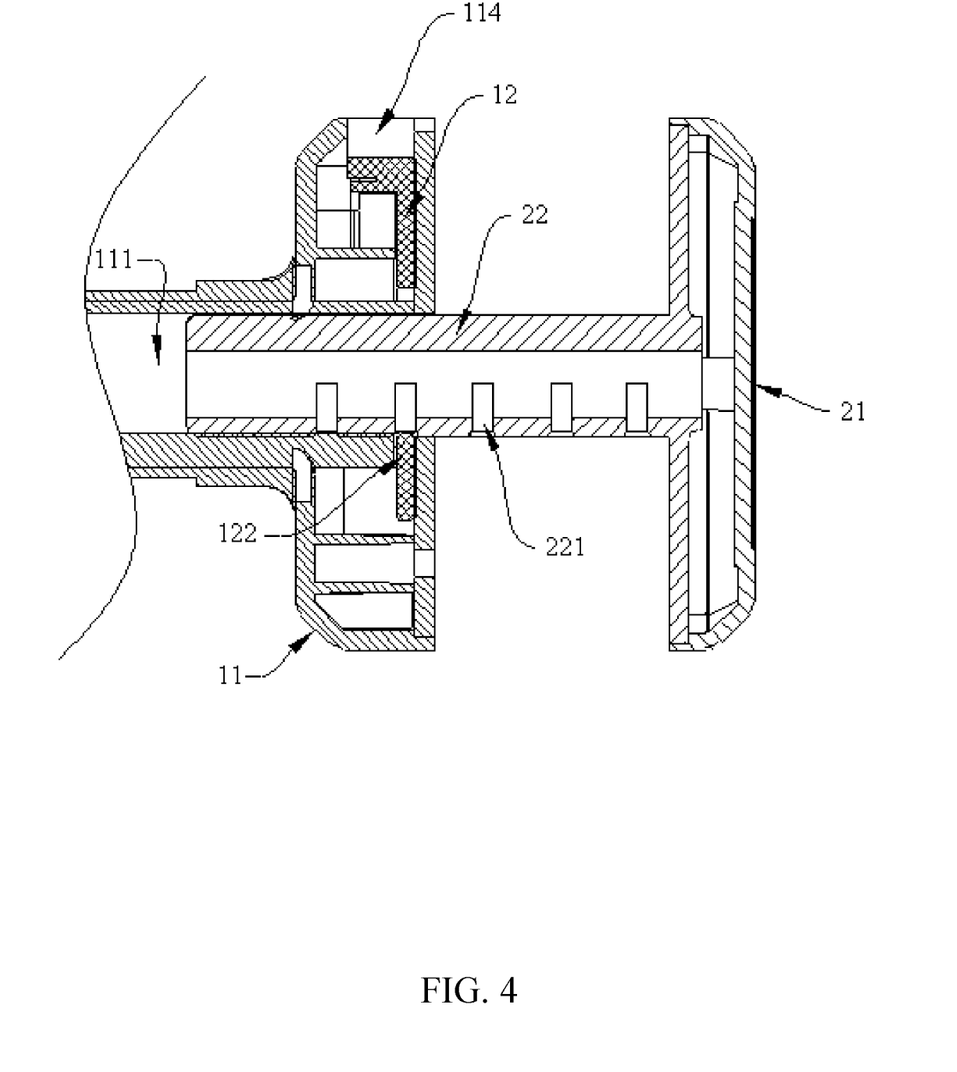
FIG. 4 is a sectional structural view of an adjustable state of an adjusting apparatus of an embodiment.
Figure 5:
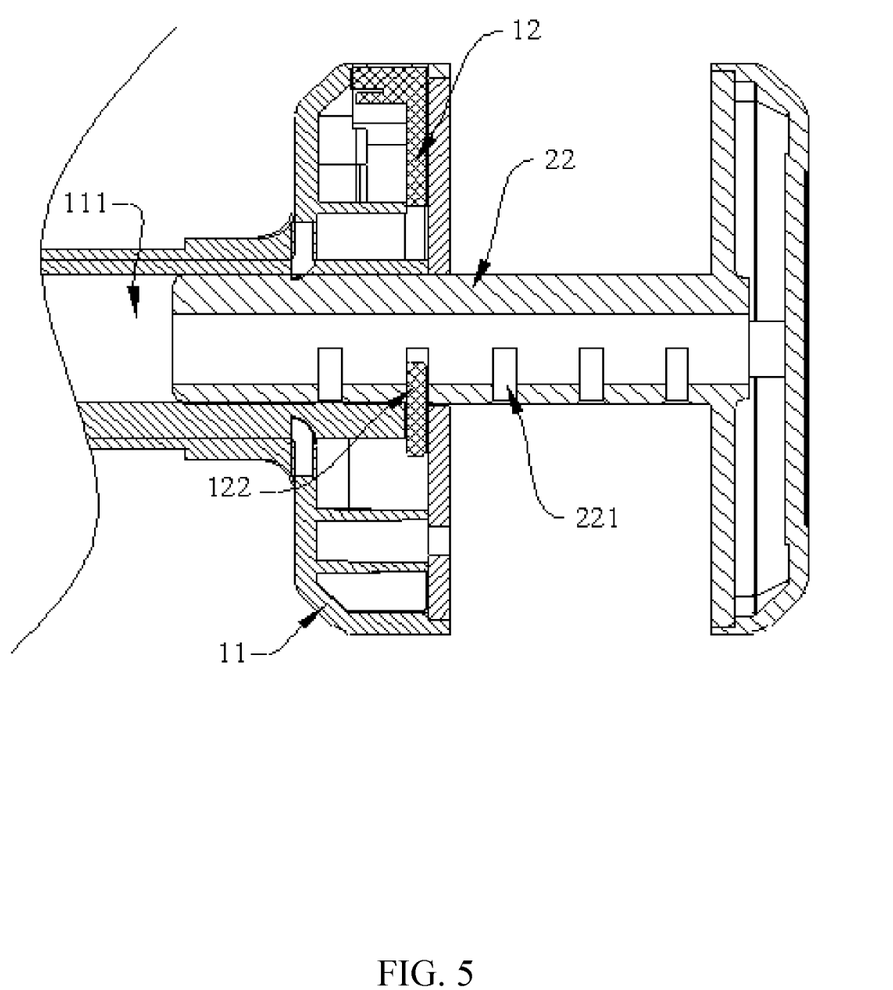
FIG. 5 is a sectional structural view of a locking state of an adjusting apparatus of an embodiment.
Figure 6:
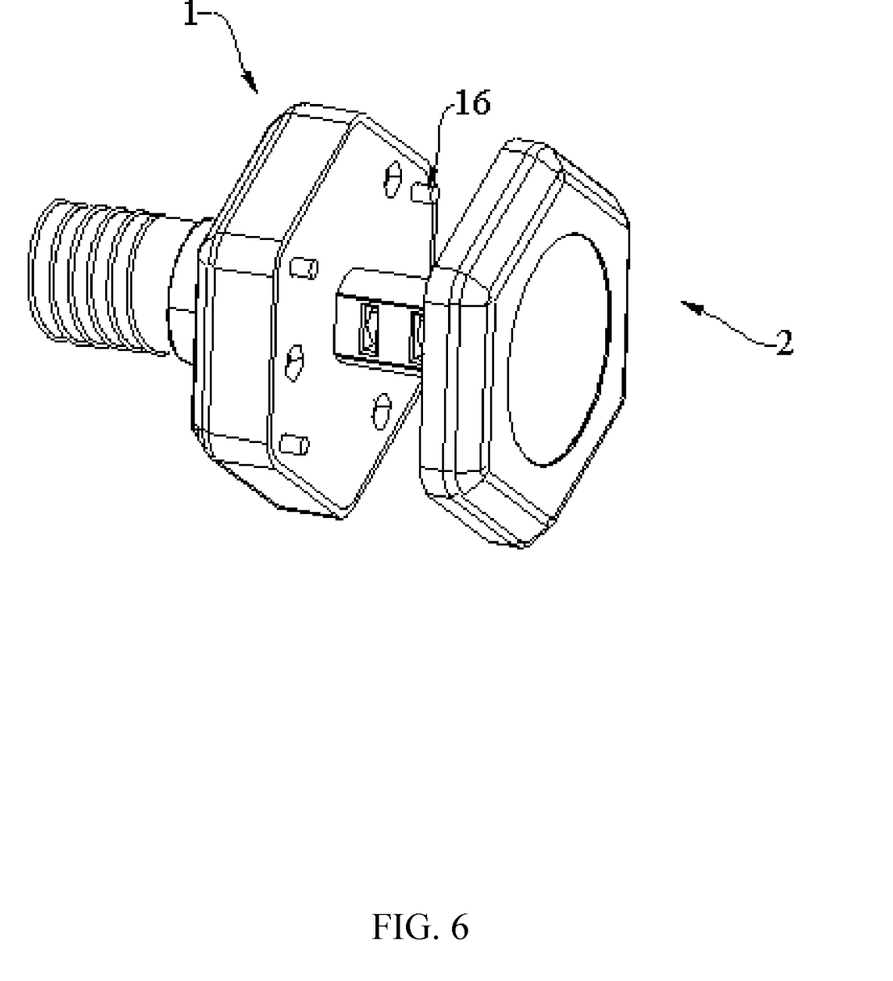
FIG. 6 is a structural view before mounting counterweight sheets of an embodiment.

Specifically, the clamping member 12 is mounted inside the main body 11 in such a manner that the sliding groove 112 is formed in the main body 11 at a position corresponding to the first through-hole 111. The size of the sliding groove 112 is matched with the main plate of the clamping member 12, so that the clamping member 12 can slide up and down inside the sliding groove 112. An opening 113 is provided at a bottom edge of the first through-hole 111, and the shape and size of the opening 113 is matched with those of the clamping tongue 122, so that the clamping tongue 122 can slide into or out of a corresponding position of the first through-hole 111 along with the clamping member 12 at the opening 113. When the sleeve rod 22 is inserted into the first through-hole 111, the clamping tongue 122 passes upwards through the opening 113 and is inserted into the clamping groove 221, whereby the limiting assembly 2 and the connection assembly 1 are locked. When the clamping tongue 122 slides out of the clamping groove 221 and slides out of the opening 113, the sleeve rod 22 can be inserted into the first through-hole 111 or pulled out of the first through-hole 111. When the clamping tongue 122 is located in the clamping groove 221 at different positions, the number of counterweight sheets that can be sleeved on the sleeve rod 22 is different, so that the counterweight of the fitness equipment can be adjusted by sleeving the different number of counterweight sheets on the limiting assembly 2. A pressing plate 123 is provided at the top of the clamping member 12, and a spring mounting plate 124 is provided at the bottom of the pressing plate 123, the first spring 13 is fixedly mounted on the spring mounting plate 124, and correspondingly, a pressing through-hole 114 is provided on an outer wall of the main body 11 corresponding to the movement direction of the clamping member 12 in the sliding groove 112, the shape and size of the pressing through-hole 114 are matched with the shape and size of the pressing plate 123, so that the pressing plate 123 is mounted inside the pressing through-hole 114 and can move downwards along the pressing through-hole 114, so that a user can press down the pressing plate 123 to release the locking of the clamping member 12 on the limiting assembly 2. A spring mounting groove 115 is further provided below the pressing through-hole 114. One end of the first spring 13 is fixedly connected to the spring mounting plate 124, and the other end of the first spring abuts against the bottom of the spring mounting groove 115. When the pressing plate 123 is pressed downwards, the first spring 13 is compressed to release the locking of the clamping member 12 on the limiting assembly 2. When the press plate 123 is released, the pressing plate 123 moves upwards under the action of the restoring force of the first spring 13, and drives the clamping member 12 to move upwards, so that when the clamping tongue 122 is inserted upward into the clamping groove 221, the clamping member 12 locks the limiting assembly 2. A limiting post 116 is provided below the pressing through-hole 114, when the pressing plate 123 moves downwards for a certain distance, the lower edge of the pressing plate 123 abuts against the limiting post 116, whereby the clamping tongue 122 is pulled out of the clamping groove 221. The arrangement of the limiting post 116 can facilitate a user to release the locking of the limiting assembly 2 when explicitly pressing to any position.

Due to the machining and assembly process of parts, certain assembly allowance needs to be reserved. When the counterweight sheets are installed on the counterweight adjusting apparatus, there is a certain gap between the counterweight sheets and the main body 11 of the connection assembly 1 or the limiting plate 21 of the limiting assembly 2, and the counterweight sheets will shake. Especially when multiple counterweight sheets are mounted, the gap between two adjacent counterweight sheets may clamp the skin of the user's hand, which will cause some damage to the user. In order to avoid the occurrence of the above situation, the present invention makes a further improvement, as shown in FIG. 1, four abutting post limiting grooves 117 are provided inside the main body 11, each of the abutting post limiting grooves 117 is internally provided with one abutting post 16, and the diameter of the middle section of each of the abutting posts 16 is greater than those of sections at two ends. A second spring 17 is sleeved on the section at one end of each abutting post 16, one end of the second spring 17 abuts against the middle section of the abutting post 16, the other end of the second spring 17 abuts against the interior of the abutting post limiting groove 117. A cover plate 14 is fixedly mounted on the main body 11 by means of screws, the cover plate 14 limits the internal parts of the main body 11 to the interior of the main body 11, and a third through-hole 140 is provided in the middle of the surface of the cover plate 14 at a position corresponding to the first through-hole 111 for the sleeve rod 22 to pass through. The fourth through-hole 141 is respectively arranged on the surface of the cover plate 14 corresponding to the position of four abutting post limiting grooves 117, the diameter of the fourth through-hole 141 is larger than the diameter of sections at two ends of the abutting post 16 and less than the diameter of the middle section of the abutting post 16. The section at the other end of the abutting post 16 protrudes from the fourth through-hole 141 under the action of the second spring 17, which is used to sleeve the counterweight sheets sleeved on the sleeve rod 22.

Preferably, a threaded structure 15 is provided on the outer surface of an end of the connection assembly 1 opposite to the main body 11, and is used for connecting a handle portion of fitness equipment. When two counterweight adjusting apparatuses are connected to a short grip rod by means of threads, a structure of the dumbbell can be formed. When the two counterweight adjusting apparatuses are connected to the long grip rod by means of threads, a structure of the barbell can be formed at this time. When the two counterweight adjusting apparatuses are connected to the handle of the kettlebell by means of threads, a structure of the kettlebell can be formed. The threaded structure 15 can be replaced by other detachable connection apparatuses, for example, a connection structure of a clamping block and a clamping groove for the purpose of detachable connection by means of rotational connection of the clamping block and the clamping groove, which is not be described in detail in this embodiment.

Figure 7:
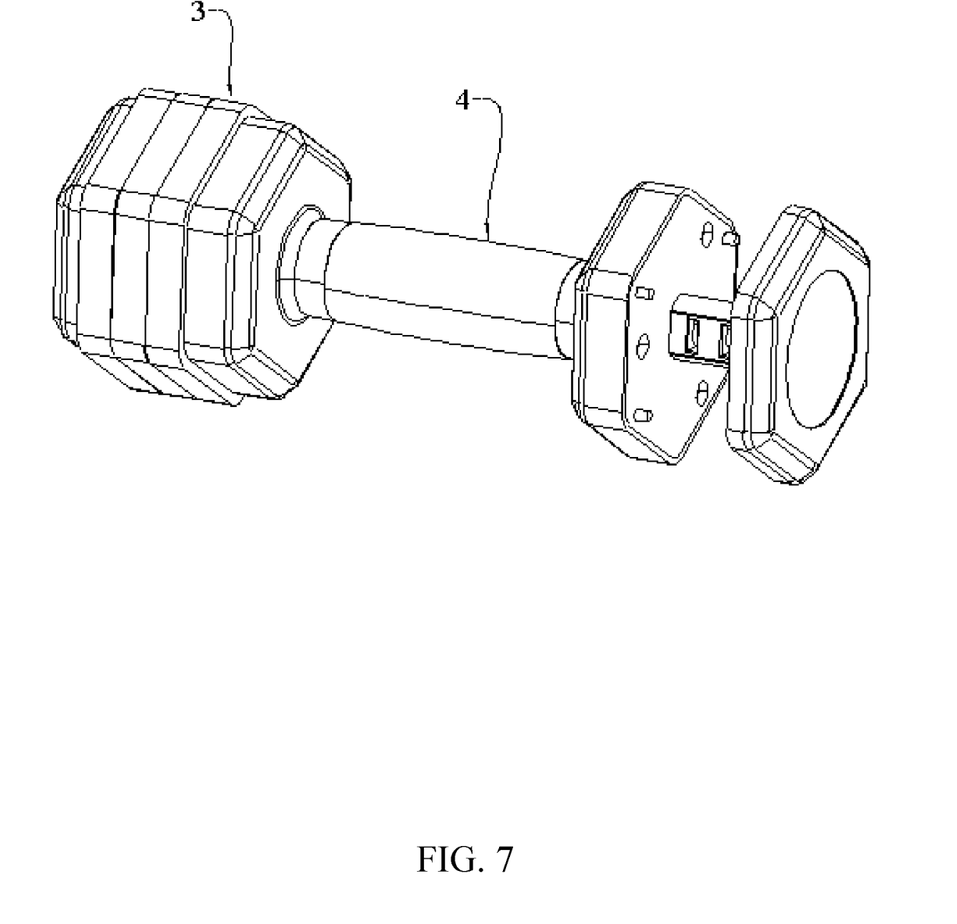
FIG. 7 is a structural view of assembling into a dumbbell of an embodiment.

As shown in FIG. 7, two ends of the short grip rod 4 are respectively connected to a counterweight adjusting apparatus by means of threads, three counterweight sheets 3 are mounted on the counterweight adjusting apparatus. When the two pressing plates 123 are respectively pressed, the limiting assembly 2 can be removed to mount or remove the counterweight sheets 3, thereby achieving the function of adjusting the counterweight.

From the above description, it can be determined that the above embodiments of the present invention achieve the following technical effects:

1. The connection assembly and the limiting assembly of the counterweight adjusting apparatus are connected in an inserting manner. In addition, the extension length, extension or pulling-out state of the limiting assembly can be limited by means of the clamping member, and the weight adjustment can be achieved by mounting different weights or different numbers of counterweight sheets on the limiting assembly. The adjustment process is simple and convenient, and is applicable to various types of counterweight sheets.

2. A threaded structure is provided on the other end of the connection assembly, which can be respectively connected to a grip of different types of weight-lifting equipment to form corresponding weight-lifting equipment, and a user can select corresponding equipment and counterweight for exercise. Compared with preparing various equipment at the same time, the occupied space is smaller.

3. An abutting post is provided inside the connection assembly, and the abutting post abuts against the counterweight sheets under the action of the second spring, thereby eliminating a gap between adjacent counterweight sheets and preventing the skin of the hand from being damaged.

Compared with the prior art, the counterweight adjusting apparatus for weight-lifting equipment of the present invention can be applied to a variety of lifting-equipment at the same time, is convenient for the mounting and adjustment of counterweight sheets having different sizes, and takes less space compared with preparing a variety of equipment at the same time.

The above description is only the preferred embodiments of the present invention, and is not intended to limit the present invention. For a person skilled in the art, the present invention may have various modifications and variations. Any modifications, equivalent replacements, improvements and the like made within the spirit and principle of the present invention shall belong to the protection scope of the present invention.

The invention claimed is:

1. A counterweight adjusting apparatus for weight-lifting equipment, comprising a connection assembly and a limiting assembly for sleeving counterweight sheets, wherein the limiting assembly comprises a limiting plate, a sleeve rod is provided on the limiting plate, the sleeve rod is inserted into the connection assembly, a clamping member is provided in the connection assembly, at least one clamping groove is provided on the sleeve rod, the clamping member is matched with the at least one clamping groove, and the clamping member is adjustably clamped with the at least one clamping groove; and the connection assembly comprises a main body, a detachable connection structure is provided on an end of the main body, and the detachable connection structure is a threaded structure.

2. The counterweight adjusting apparatus for weight-lifting equipment of claim 1, wherein a first through-hole is provided inside the main body, a cross-sectional shape of the first through-hole is a non-circular through-hole shape, and a cross-sectional shape of the sleeve rod is matched with the cross-sectional shape of the first through-hole.

3. The counterweight adjusting apparatus for weight-lifting equipment of claim 2, wherein a sliding groove is provided inside the main body at a position corresponding to the first through-hole, and a size of the sliding groove is matched with a main plate of the clamping member; the main plate of the clamping member is provided with a second through-hole used for the sleeve rod to pass through, a clamping tongue is provided on an inner wall of the second through-hole, correspondingly, an opening is provided on a bottom end edge of the first through-hole, and a shape and size of the opening are matched with a shape and size of the clamping tongue.

4. The counterweight adjusting apparatus for weight-lifting equipment of claim 3, wherein a pressing plate is provided at a top of the clamping member, a first spring is provided at a bottom of the pressing plate, correspondingly, a pressing through-hole is provided at a position of an outer wall of the main body corresponding to the pressing plate, a spring mounting groove is provided below the pressing through-hole, one end of the first spring is fixedly connected to the pressing plate, and another end of the first spring abuts against a bottom of the spring mounting groove.

5. The counterweight adjusting apparatus for weight-lifting equipment of claim 4, wherein a limiting post is provided below the pressing through-hole, when the pressing plate moves downwards for a distance, a lower edge of the pressing plate abuts against the limiting post, whereby the clamping tongue is pulled out of the at least one clamping groove.

6. The counterweight adjusting apparatus for weight-lifting equipment of claim 4, wherein a spring mounting plate is provided at the bottom of the pressing plate, and the first spring is fixedly connected to the spring mounting plate.

7. The counterweight adjusting apparatus for weight-lifting equipment of claim 4, wherein a cover plate is detachably connected to the main body; at least one abutting post limiting groove is provided inside the main body; a fourth through-hole is provided on the cover plate at a position corresponding to the at least one abutting post limiting groove; an abutting post is mounted inside the at least one abutting post limiting groove; a diameter of a middle section of the abutting post is greater than diameters of sections at two ends of the abutting post, respectively; a second spring is sleeved on the section at one end of the abutting post; one end of the second spring abuts against the middle section of the abutting post; another end of the second spring abuts against an interior of the at least one abutting post limiting groove; and the section at the other end of the abutting post protrudes from the fourth through-hole under an elastic force of the second spring.

* * * * *